US007796606B2

(12) United States Patent
Taub

(10) Patent No.: US 7,796,606 B2
(45) Date of Patent: Sep. 14, 2010

(54) PRIORITIZATION OF EMERGENCY VOICE AND DATA COMMUNICATIONS

(75) Inventor: Jonathan A. Taub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 11/731,949

(22) Filed: Apr. 2, 2007

(65) Prior Publication Data

US 2008/0240148 A1 Oct. 2, 2008

(51) Int. Cl.
H04L 12/28 (2006.01)
(52) U.S. Cl. .................................. 370/395.21
(58) Field of Classification Search ................ 370/431, 370/442, 443, 444, 351, 389, 395.1, 395.4, 370/395.42, 395.41, 395.43, 357, 359, 463, 370/419, 395.21, 395.2; 709/204, 207
See application file for complete search history.

(56) References Cited

U.S. PATENT DOCUMENTS

| | | | | |
|---|---|---|---|---|
| 5,845,213 | A * | 12/1998 | Sumner et al. ............... 455/458 |
| 6,198,930 | B1 | 3/2001 | Schipper ..................... 455/440 |
| 6,236,861 | B1 | 5/2001 | Naor et al. .................. 455/458 |
| 7,015,817 | B2 | 3/2006 | Copley et al. ............ 340/573.4 |
| 7,123,141 | B2 | 10/2006 | Contestabile .......... 340/539.13 |
| 2004/0122296 | A1 * | 6/2004 | Hatlestad et al. ............ 600/300 |
| 2004/0192337 | A1 * | 9/2004 | Hines et al. .............. 455/456.1 |
| 2005/0007969 | A1 * | 1/2005 | Hundscheidt et al. ....... 370/312 |
| 2005/0114478 | A1 * | 5/2005 | Popescu et al. ............. 709/220 |
| 2005/0246732 | A1 * | 11/2005 | Dudkiewicz et al. .......... 725/13 |
| 2006/0105795 | A1 | 5/2006 | Cermak et al. ............... 455/518 |
| 2006/0117341 | A1 * | 6/2006 | Park ............................ 725/34 |
| 2006/0158328 | A1 | 7/2006 | Culpepper et al. ..... 340/539.13 |
| 2006/0166679 | A1 | 7/2006 | Karaoguz et al. ......... 455/456.1 |
| 2007/0032249 | A1 | 2/2007 | Krishnamurthi et al. . 455/456.1 |
| 2007/0037588 | A1 | 2/2007 | Mohi et al. ............... 455/456.5 |
| 2007/0105565 | A1 * | 5/2007 | Enzmann et al. ......... 455/456.1 |

OTHER PUBLICATIONS

Jeffrey Hightower et al., "A Survey and Taxonomy of Location Systems for Ubiquitous Computer," University of Washington, Computer Science and Engineering, Technical Report UW-CSE 01-08-03, Aug. 24, 2001 (pp. 1-29), http://katahdin.cs.dartmouth.edu/-dik/papers/chem:survey-tr.pdf.

(Continued)

*Primary Examiner*—Kwang B Yao
*Assistant Examiner*—Obaidul Huq
(74) *Attorney, Agent, or Firm*—Merchant & Gould P.C.

(57) ABSTRACT

Prioritized communications are facilitated based on a receiving user's designation of a source (initiator), a delivery mode, and other parameters associated with the communication. The receiver may configure a list of preapproved initiators, delivery devices and modes, and any associated services such as a locator service, a mapping service, a directory service, etc. The communication is initiated by the initiator or automatically from an application associated with the initiator's device. A communication service or a hosted service retrieves receiver information and facilitates prioritized communication also providing optional services associated with the communication.

20 Claims, 6 Drawing Sheets

OTHER PUBLICATIONS

Guanling Chen et al., "A Survey of Context-Aware Mobile Computing Research," Department of Computer Science, Dartmouth College, Dartmouth Computer Science Technical Report TR2000-381, 2001 (pp. 1-16), http://seattle.intel-research.net/people/hightower/pubs/hightower 2001survey/-pdf.

Eija Kaasinen, "User Needs for Location-Aware Mobile Services," Pers Ubiquit Comput (2003), Aug. 1, 2003 (pp. 70-79), http://www.wodo.com/external/pdf/reports/user_need_for_location_mobile_svcs.pdf.

* cited by examiner

NETWORK ENVIRONMENT

PRIORITIZATION OF EMERGENCY VOICE AND DATA COMMUNICATIONS

BACKGROUND

With the proliferation of mobile devices and diversification of communication applications, users of computing devices are accessible through many communication modes. Electronic mail, text messaging, voicemail, video communication are just a few examples of communication that may be established through a variety of stationary (e.g. desktop) and mobile (e.g. handheld) computing devices.

Increased and diverse accessibility has its advantages and disadvantages. On one hand all kinds of communication including unwanted communication (e.g. spam emails) can reach the users in multiple modes now, even when the user does not desire to receive such communication. On the other hand, ways for a user to define or limit communication he/she wants to receive and how to receive those are typically limited.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing prioritized communication based on a receiving user's designation of a source, a delivery mode, and other parameters associated with the communication. According to some embodiments, a direct communication between an initiator and a receiver may be facilitated based on the receiver's designation of permitted initiator(s), delivery mode, additional services associated with the communication, and the like. According to other embodiments, a hosted service may facilitate prioritized communication between a plurality of initiators and a plurality of receivers based on each receiver's designated permissions and communication parameters.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, prioritized communications may be facilitated between one or more initiators and a receiver based on the receiver's preferences of permitted initiators and communication parameters. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
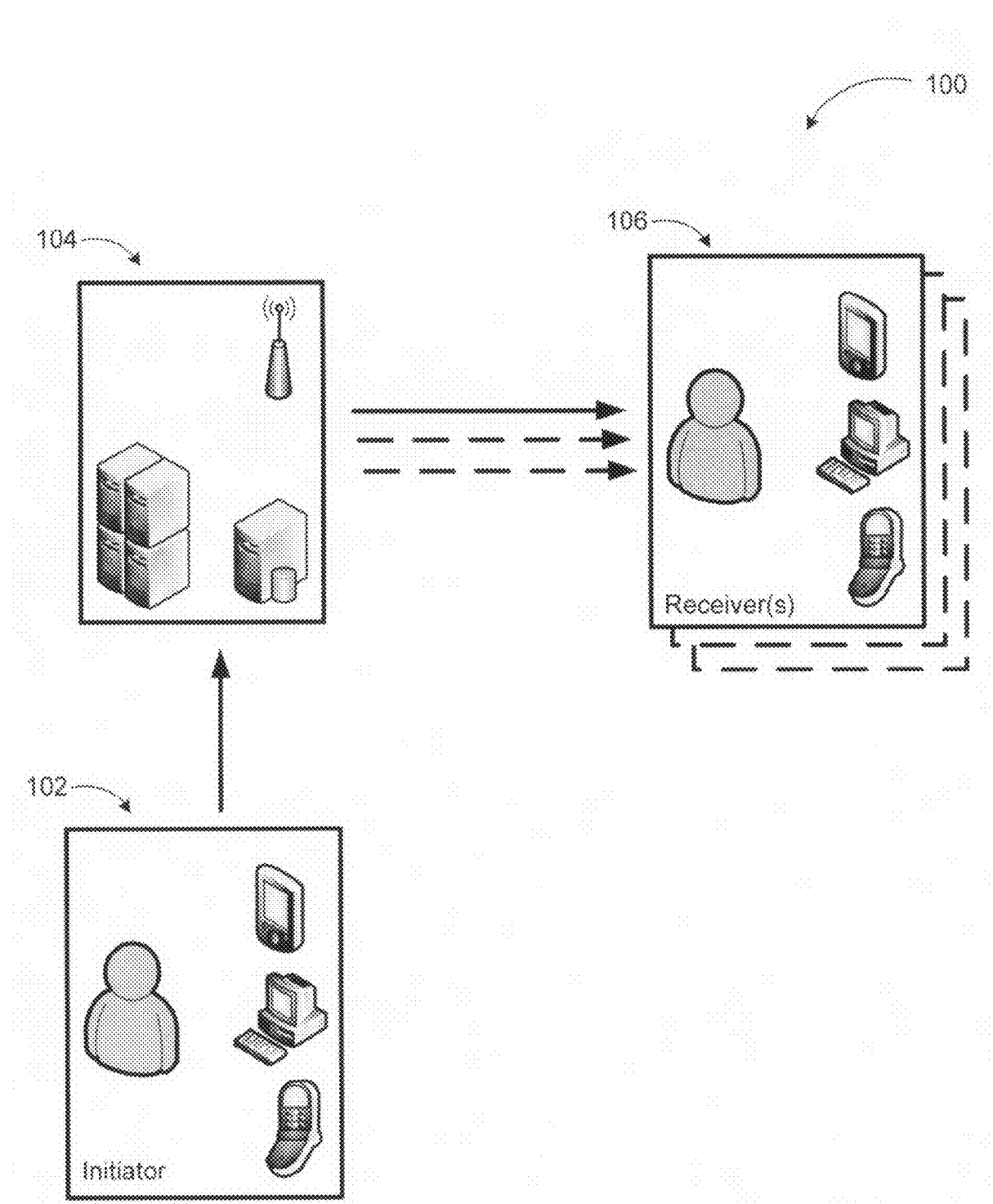
FIG. 1 illustrates an example communication prioritization system architecture.

Referring to FIG. 1, an example communication prioritization system architecture 100 is illustrated. While communication prioritization system 100 may be implemented with many nodes, a basic example system is illustrated in FIG. 1.

In a basic configuration, a system according to embodiments may include three types of nodes: an initiator 102, a facilitator (or broadcaster) 104, and one or more receivers 106. The initiator 102 is the person that triggers the prioritized communication such as an emergency alert. The initiator may utilize a variety of devices and/or applications to initiate the prioritized communication. Hard or soft keys on mobile devices (e.g. cellular phones), dropdown menu items, icons on an application user interface are some examples of how the communication may be triggered by the initiator. According to other embodiments, the communication may also be initiated automatically based on a sensor module associated with the initiator's device. For example, a medical condition monitoring sensor (e.g. blood sugar level monitoring sensor) may detect an abnormal condition and trigger an alert when the initiator may be incapacitated. Similarly, a gyroscopic sensor attached to a mobile device may detect a fall and trigger the alert.

According to further embodiments, the prioritized communication may also be initiated based on a predefined condition in an application associated with the initiator. For example, a locator service may determine that the initiator's device has entered a restricted area (or exited a permitted area) and trigger an alert. Likewise, a time limit may be preset in the initiator device, and if no action is taken by the preset time limit, communication may be initiated. Examples for the latter scenario include a parent monitoring their children, a car rental company monitoring a late return, and the like.

The facilitator 104 may be a hosted service providing communication services between users with features supporting prioritized communication. The hosted service may enable receivers to set their parameters for prioritized communication such as a list of preapproved initiators, a list of associated services (locator service, directory service, mapping service, etc.), a list devices to receive the prioritized communication, delivery mode (electronic mail, text message, voice, video, etc.), and so on. According to some embodiments, facilitator 104 may even keep track of a receiver's location and adjust some of the parameters such as delivery mode accordingly. For example, if the receiver is determined to be at the same location as one of his/her preapproved initiators, there may not be a need to establish prioritized communication between the two, and alerts may be turned off for the initiators at the same location as the receiver. An example of this scenario may be a doctor with his/her patients designated as initiators. When the doctor is visiting a patient, an alert from the patient's device based on a medical condition sensor may go off. Because the doctor is already with the patient, there is no need to forward that alert to the doctor.

The facilitator 104 may also include a communication service of an organization for its members such as a company's electronic mail system for its employees. The facilitator may further include a telecommunication service provider such as a cellular service operator or even an Internet service provider. Services provided by the facilitator may be a subscription service, a pay-as-you-go service, and the like. Additional services such as the locator service or a directory service that provides information associated with emergency service providers near the initiator's location may be provided by third parties and integrated into the prioritized communication system as described below in conjunction with FIG. 2.

The receiver 106 is the person receiving the prioritized communication. As such, receiver 106 may be a subscriber of the host service acting as facilitator. The receiver may define his/her preapproved initiator(s) list and the communication parameters described above. When prioritized communication is received from an initiator, the receiver may be alerted through a number of ways discussed below and provided optional services such as a locator service for the initiator's location, a mapping service to map the initiator's location, a directory service for numbers of emergency service providers in the initiator's vicinity, and the like.

While the example system above is described as being receiver driven (the receiver defines preapproved initiator list, etc.), the system may also be an open subscription service where initiators can define multiple receivers for their prioritized communications. According to yet further embodiments, the receivers may include groups of receivers with one or more among the group having administrative rights that enable them to set the parameters for other receivers within the group as well as define target receivers for selected initiators. An example of this scenario is a family, where one parent sets the parameters for both parents as well as others (e.g. a nanny, another relative) and defines who the target receivers are for each initiator (children of the family, grandparents, etc.).

Figure 2:
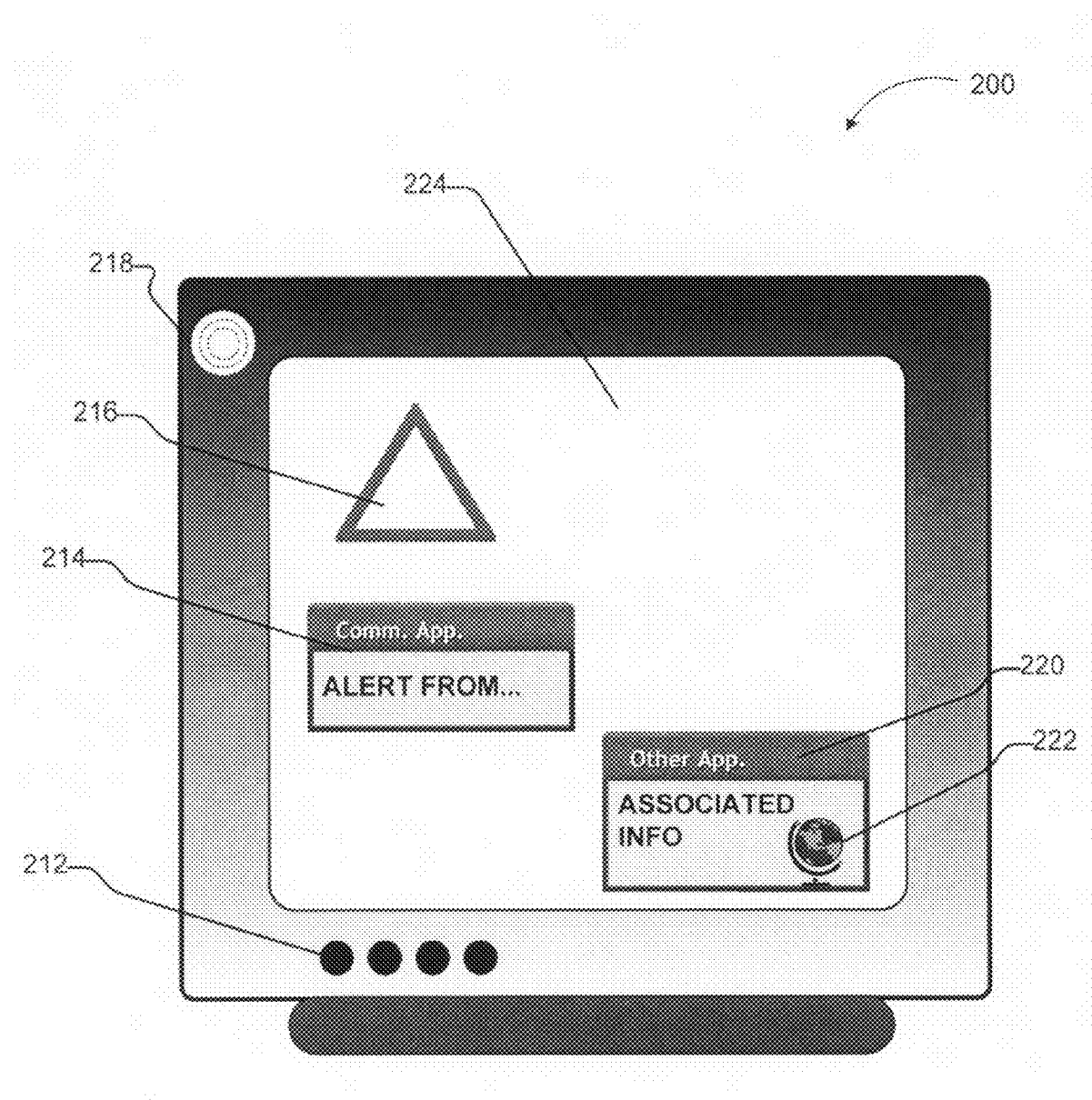
FIG. 2 illustrates example delivery of prioritized communications on a desktop screen.

FIG. 2 illustrates example delivery of prioritized communications on a desktop screen. Prioritized communication may be delivered to a receiver through a mobile device or a stationary device. Voice communications through a cellular or landline phone are a couple of basic examples. In a more complex configuration, software applications with multiple features may be employed to facilitate prioritized communication, according to embodiments.

Desktop screen 224 may be part of a desktop computing device with additional input and output capabilities such as speaker 218 and a microphone (not shown) for voice communications. A received alert may be presented to the receiver through a graphical presentation such as an alert symbol 218 flashing on the display.

In other embodiments, the user interface of a communication application 214, such as an electronic mail application, a text messaging application, an Internet telephony application, and the like, may be used to convey the received alert and establish two-way communication if applicable or desired. Other application 220 may be any application providing a service associated with the prioritized communication such as a mapping service (222) or a locator service.

According to some embodiments, communication application 214 may include a user interface for the receiver to configure his/her communication parameters, modify preapproved initiators list, and the like. Another user interface associated with the communication application 214 may present the receiver with options for associated services when an alert is received and activate (and configure) other application(s) 220 automatically. For example, in the doctor-patient scenario, a user interface of the communication application may provide the doctor options to activate sensor data analysis applications, database access applications for retrieving patient data, a directory service of nearby medical facilities, and the like.

The features described above for providing prioritized communication to a receiver may be implemented in any computing device including, but not limited to, a personal digital assistant, a cellular phone, a laptop PC, a smart automobile console, and the like.

Figure 3:
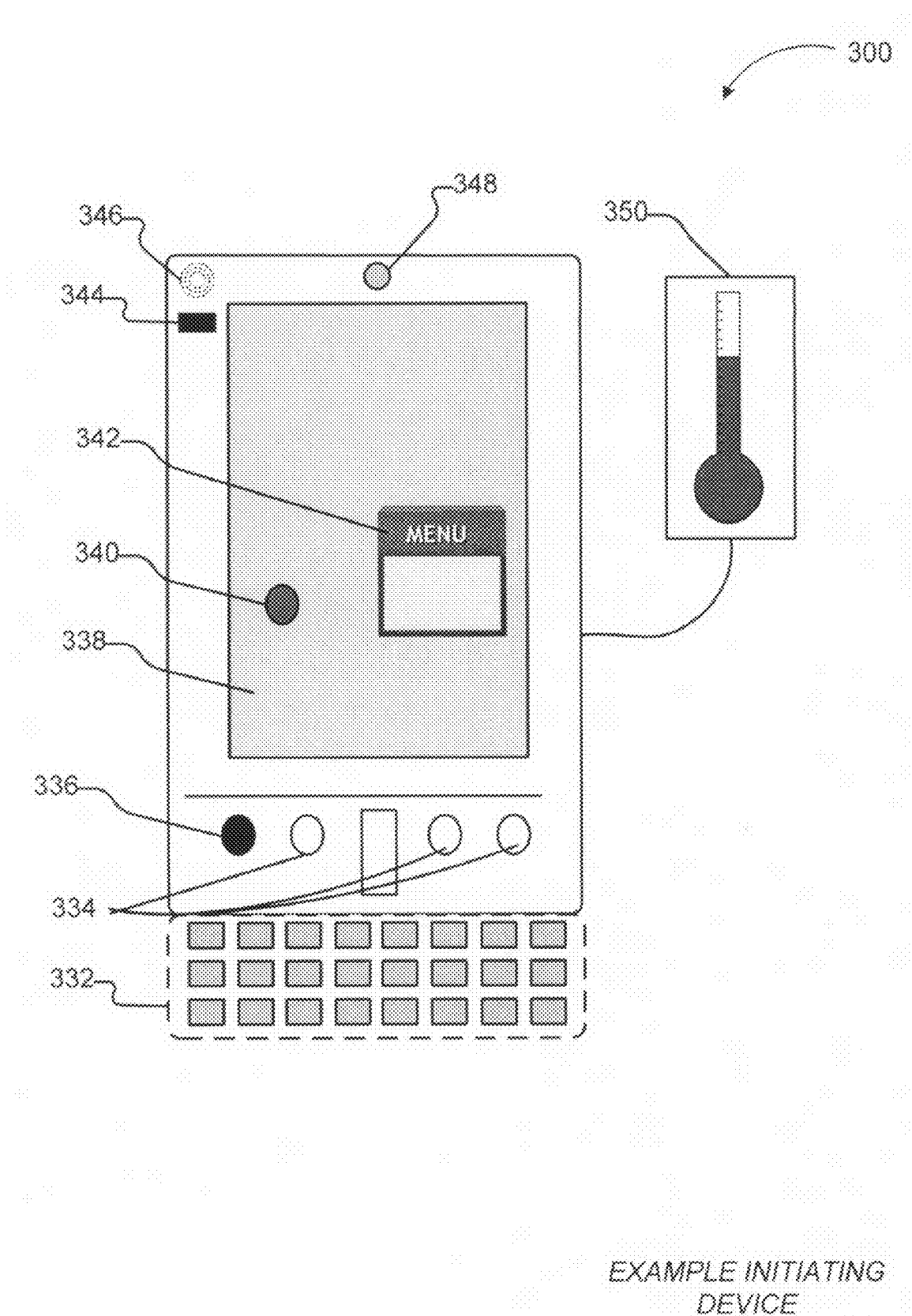
FIG. 3 illustrates example initiation of prioritized communications from a mobile device.

FIG. 3 illustrates example initiation of prioritized communications from a mobile device. While prioritized communications may be initiated from any type of communication device including cellular phones, desktop computers, and the like, mobile devices are the more likely type of device to be used for this purpose.

Mobile device 300 is shown with many features. However, embodiments may be implemented with fewer or additional components. Example mobile device 300 includes typical components of a mobile communication device such as a hard keypad 332, specialized buttons ("function keys") 334, display 338, and one or more indicators (e.g. LED) 344. Mobile device 300 may also include a camera 348 for video communications and microphone 346 for voice communications. Display 338 may be an interactive display (e.g. touch sensitive) and provide soft keys as well.

To initiate prioritized communication, one or more hard or soft keys (e.g. hard key 336 and soft key 340) may be used as dedicated triggers. A prioritized communication application user interface 342 may also be provided with a menu of selections for target receiver, mode of communication, and so on. Mobile device 300 may also include standard electronic mail or voice communication features, which may be used to initiate the prioritized communication as well.

Furthermore, mobile device 300 may be associated with one or more sensor devices (or applications), which may trigger the prioritized communication automatically. For example, a medical condition monitoring sensor may initiate the communication when a preset threshold for one of the monitored conditions is exceeded. Another example may be a gyroscopic sensor that detects a fall of the device and alerts a receiver (the device may be owned by an elderly person, who may be incapacitated by the fall).

As described above, additional initiation mechanisms may also be employed. For example, an application may be configured to initiate the prioritized communication based on expiration of a preset time period or based on a location of the mobile device 300.

The prioritized communication systems, components, features, and scenarios in FIG. 1, FIG. 2, and FIG. 3 are exemplary for illustration purposes. A system for facilitating prioritized communication may be implemented using additional or fewer components and features using the principles described herein. Other scenarios are also possible in a system like the one described here.

Figure 4:
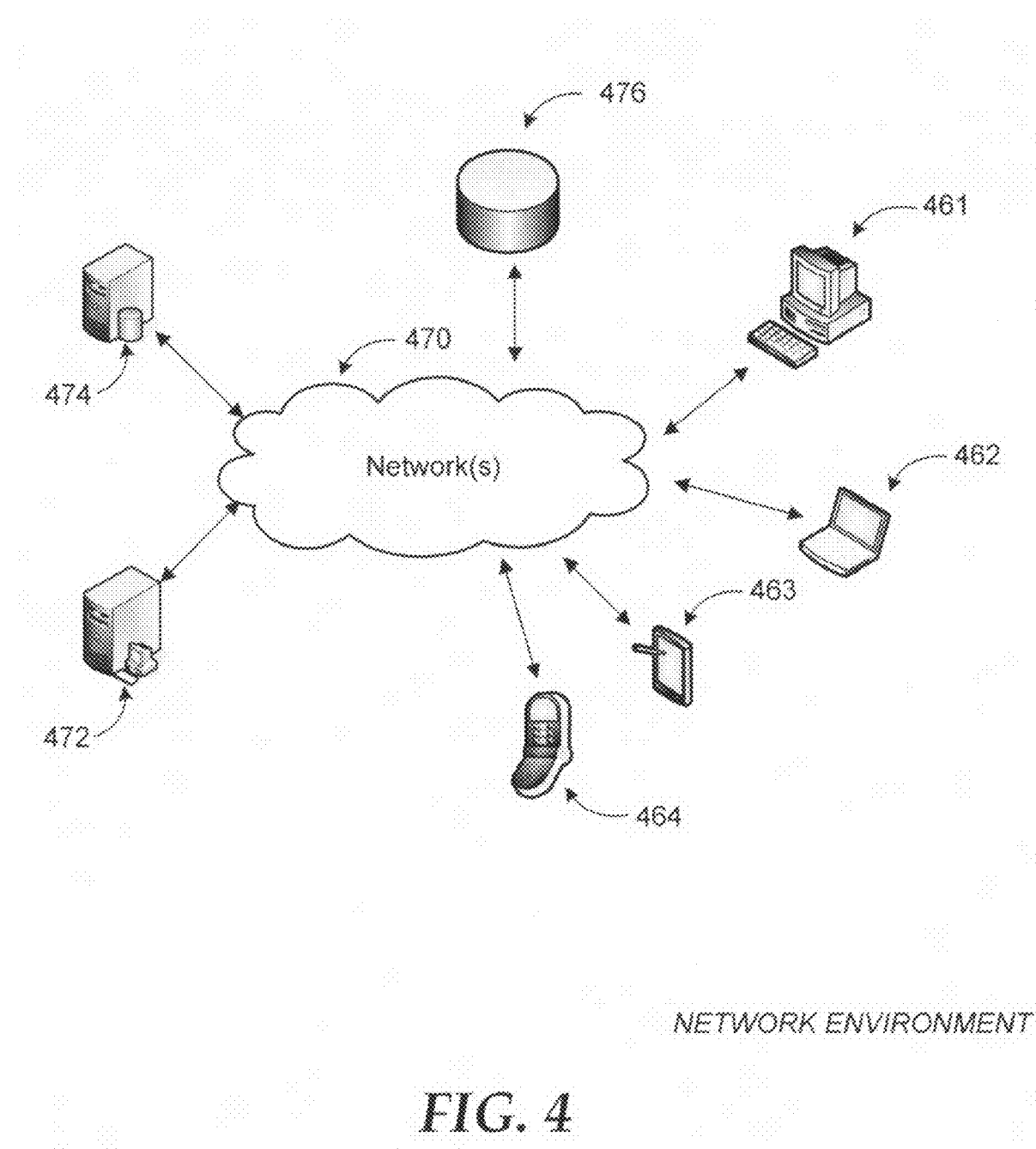
FIG. 4 is an example networked environment, where embodiments may be implemented.

FIG. 4 is an example networked environment, where embodiments may be implemented. A communication prioritization system/application may be implemented locally on a single computing device or in a distributed manner over a number of physical and virtual clients and servers. They may also be implemented in un-clustered systems or clustered systems employing a number of nodes communicating over one or more networks (e.g. network(s) 470).

Such a system may comprise any topology of servers, clients, Internet service providers, and communication media. Also, the system may have a static or dynamic topology. The term "client" may refer to a client application or a client device. While a networked system implementing communication prioritization may involve many more components, relevant ones are discussed in conjunction with this figure.

Applications associated with communication prioritization system for initiating or receiving the priority communications may be implemented in individual client devices 461-464 or executed in server 472 and accessed from anyone of the client devices (or applications). Furthermore, a hosted service facilitating the communication prioritization may be executed in one or more servers (e.g. server 472) and accessed by the client devices (or applications).

Data stores associated with prioritized communications may be embodied in a single data store such as data store 476 or distributed over a number of data stores associated with individual client devices, servers, and the like. Dedicated database servers (e.g. database server 474) may be used to coordinate data retrieval and storage in one or more of such data stores. The data store(s) may store information associated with the prioritization such as permitted initiator(s) for each receiver, communication parameters (e.g. delivery mode) for each receiver, associated services data (e.g. maps, contact information, etc.), and the like.

Network(s) 470 may include a secure network such as an enterprise network, an unsecure network such as a wireless open network, or the Internet. Network(s) 470 provide communication between the nodes described herein. By way of example, and not limitation, network(s) 470 may include wired media such as a wired network or direct-wired connection, and wireless media such as acoustic, RF, infrared and other wireless media.

Many other configurations of computing devices, applications, data sources, data distribution systems may be employed to implement communication prioritization. Furthermore, the networked environments discussed in FIG. 4 are for illustration purposes only. Embodiments are not limited to the example applications, modules, or processes.

Figure 5:
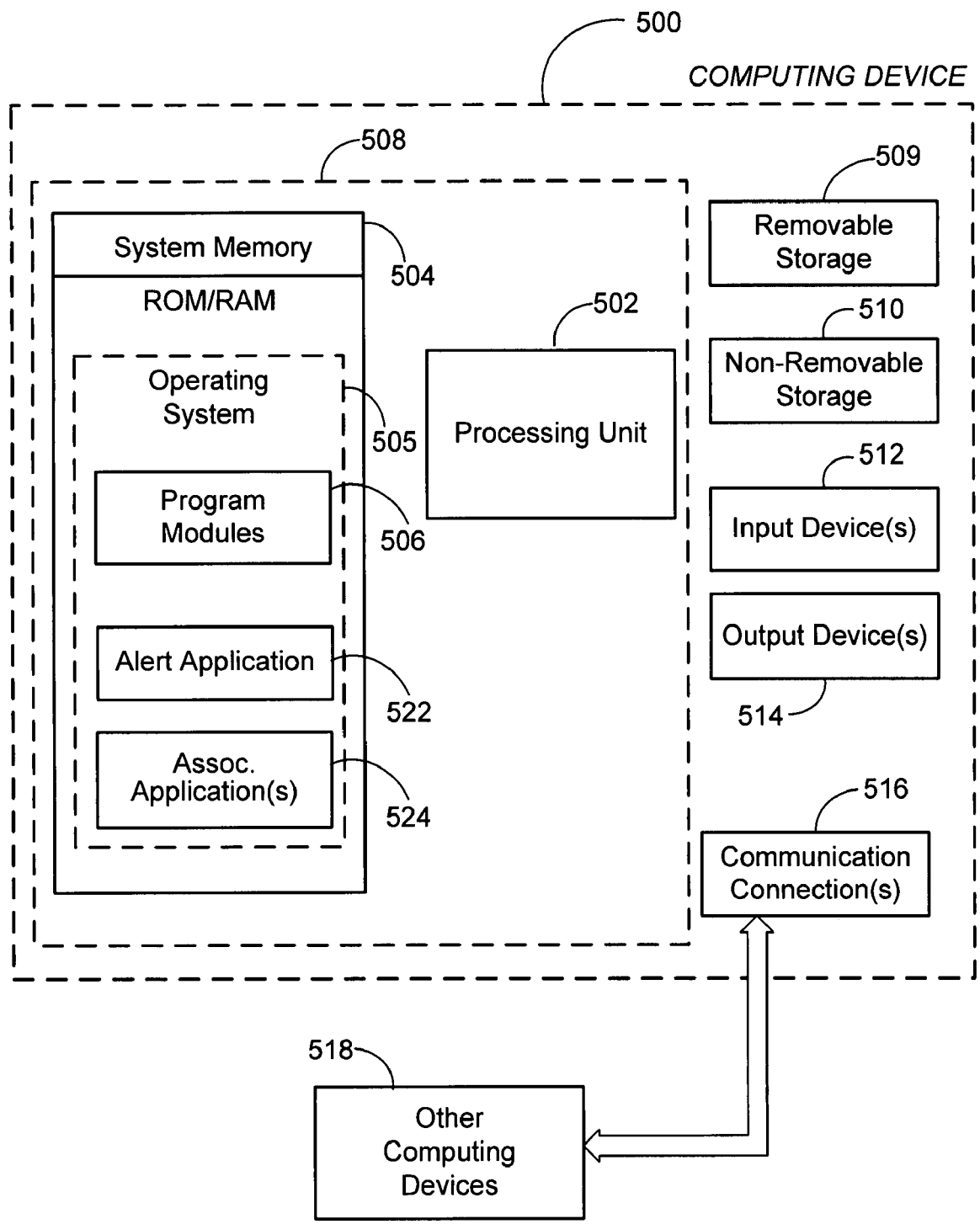
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a server or a client device providing communication prioritization in conjunction with a hosted service and typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 506, alert application 522, and associated application(s) 524.

Alert application 522 may be a separate application or an integral module of a hosted service that provides prioritized communication services to client applications associated with computing device 500. Associated application(s) 524 may provide services associated with the prioritized communications such as maps, emergency contact information, sensory input analysis, and the like, as described previously. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that execute applications associated with a data access and directory service. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

As discussed previously, computing device 500 may typically be a mobile device when used for initiating a prioritized communication. As such, it may include typical mobile device components such as a keypad, a transceiver module, etc. If computing device is providing hosted services facilitating the prioritized communications, it may typically be a server that communicates with the client devices of the initiator(s) and the receiver(s).

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
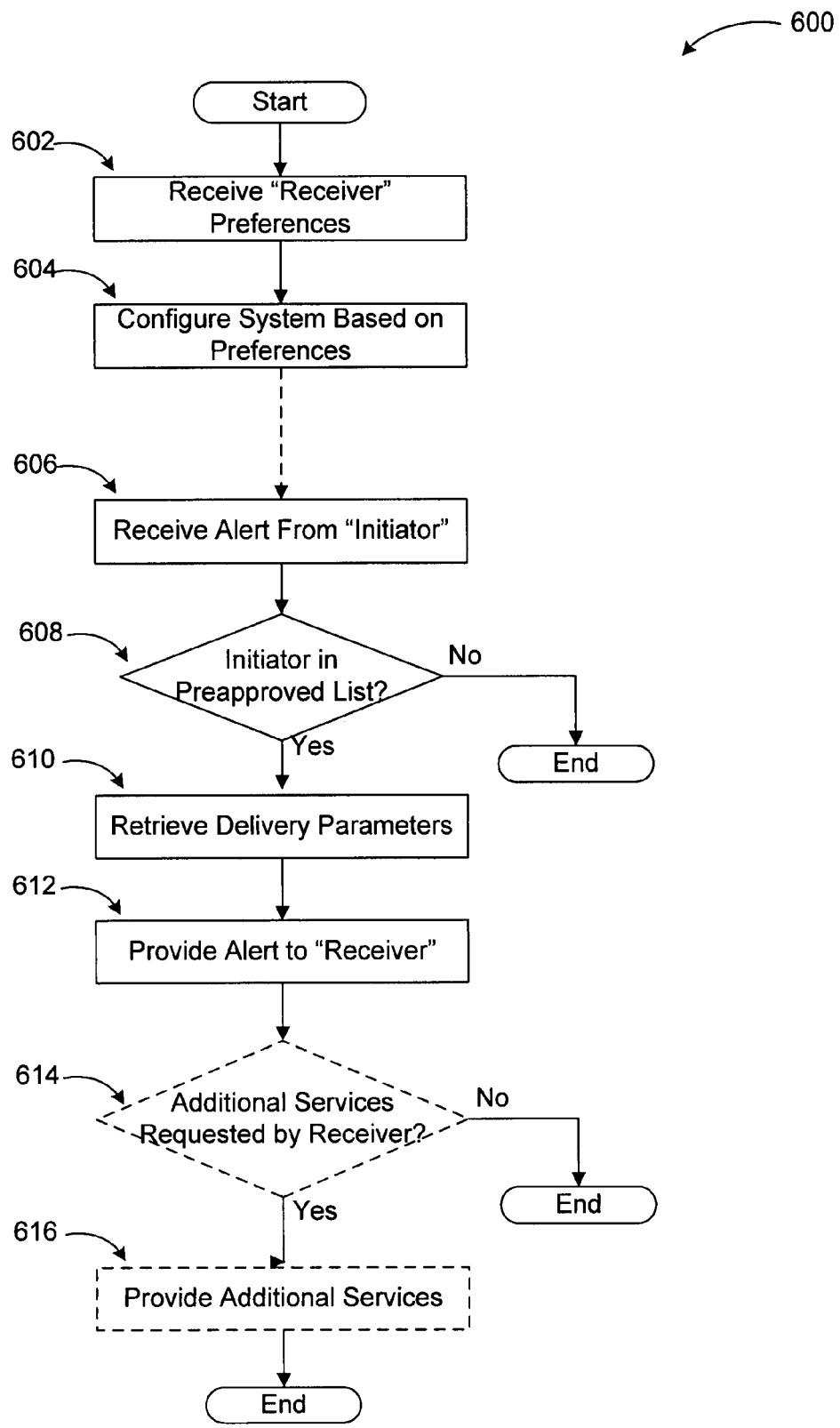
FIG. 6 illustrates a logic flow diagram for a process of facilitating prioritized communications between initiator(s) and receiver(s).

FIG. 6 illustrates a logic flow diagram for process 600 of facilitating prioritized communications between initiator(s) and receiver(s). Process 600 may be implemented as part of a hosted service.

Process 600 begins with operation 602, where a receiver's preferences are received. Receiver preferences may include a list of preapproved initiators, communication parameters such as delivery mode, a list of associated services (e.g. a mapping service), and the like. Processing advances from operation 602 to operation 604.

At operation 604, the system is configured based on the received preferences. For example, the preferences may be stored in a data store for subsequent retrieval when the communication is to be facilitated. A next phase of process 600 begins upon receipt of an alert from an initiator, which may not automatically follow the configuration of the system based on the receiver preferences. This relationship is indicated in FIG. 6 by the dashed line connecting operation 604 and 606.

At operation 606, an alert is received from an initiator as described in more detail in conjunction with FIG. 3. Processing moves from operation 606 to decision operation 608.

At decision operation 608, a determination is made whether the initiator is in the preapproved list of the target receiver. If the initiator is not in the preapproved list, a rejection message may be provided to the initiator and processing moves to a calling process for further actions. If the initiator is in the preapproved list, processing advances to operation 610.

At operation 610, delivery parameters associated with the target receiver (and the initiator) are retrieved. In some embodiments, different delivery parameters such as alert method, receiving device, and the like, may be specified for each initiator on a receiver's preapproved list. Thus, the delivery parameters may be retrieved depending on which initiator the alert is coming from. Processing advances from operation 610 to operation 612.

At operation 612, the alert is provided to the receiver (or receivers in case of multiple receivers) using the retrieved delivery parameters. Processing moves from operation 612 to optional decision operation 614.

At optional decision operation 614, a determination is made whether any additional services are requested by the receiver. As described previously, additional services may include a mapping service, a directory service providing location and/or numbers of emergency services near the initiator, a locator service for determining a location of the initiator, a sensory input analysis service, and the like. If additional services are requested, processing advances to optional operation 616. Otherwise, processing continues to a calling process for further actions.

At optional operation 616, the requested services are provided by the hosted service. After operation 616, processing moves to a calling process for further actions.

The operations included in process 600 are for illustration purposes. Facilitating prioritized communications may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing prioritized communications, the method comprising:
   receiving a prioritized communication preference from a receiver;
   storing the received preference;
   in response to receiving a request for prioritized communication from an initiator, determining whether the initiator is in a preapproved list of the receiver;
   if the initiator is in the preapproved list, retrieving the stored preference;
   configuring a communication system based on the retrieved preference;
   facilitating the prioritized communication between the initiator in the preapproved list and the receiver using the communication system configured based on the retrieved preference;
   presenting, in a user interface associated with a communication application, the receiver with a plurality of options for associated services when the prioritized communication is received, the plurality of options comprising activating sensor data analysis applications, database access applications for retrieving data associated with the initiator, and a directory service of nearby facilities;
   automatically activating, in the user interface, the plurality of other applications, the plurality of other applications including the sensor data analysis applications, the database access applications, and the directory service;

tracking a location of the receiver; and adjusting a delivery mode for the prioritized communication when the receiver is determined to be at the same location as the initiator in the preapproved list, wherein the prioritized communication is not needed when the initiator is at the same location as the receiver.

2. The method of claim 1, further comprising:

providing the receiver a selection of additional services associated with the prioritized communication; and in response to receiving a request for at least one of the additional services from the receiver, activating the at least one additional service.

3. The method of claim 1, wherein the prioritized communication preference includes at least one from a set of: a list of preapproved initiators, a list of devices to receive the prioritized communication, a list of applications to receive the prioritized communication, a delivery mode, and a list of restrictions on delivery.

4. The method of claim 1, wherein receiving the prioritized communication preference from the receiver includes:

providing the receiver a list of default options for the preference; and enabling the receiver to modify the default options.

5. The method of claim 1, wherein the additional services further include at least one from a set of: a mapping service, a directory service, a sensory input analysis service, and a secondary communication service.

6. The method of claim 1, wherein the prioritized communication includes one of: an electronic mail, a text message, a voice communication, and a video communication.

7. The method of claim 1, wherein the delivery mode includes at least one from a set of: a graphic display alert, a text-based alert, a sound alert, and a vibration alert.

8. The method of claim 1, further comprising:

in response to receiving a request for prioritized communications with a plurality of receivers from an initiator, determining whether the initiator is in preapproved lists of the plurality of receivers; and if the initiator is in the preapproved lists, facilitating the prioritized communications between the initiator and the plurality of receivers.

9. A system for providing prioritized communications, comprising:

a memory;

a data store;

a processor coupled to the memory and the data store, wherein the processor is configured to execute program instructions for:

receiving prioritized communication preferences from a receiver;

storing the received preferences in the data store;

in response to receiving a request for prioritized communication from an initiator, determining whether the initiator is in a preapproved list of at least one receiver;

if the initiator is in the preapproved list, retrieving the stored preferences from the data store;

configuring a communication system based on the retrieved preferences;

facilitating the prioritized communication between the initiator in the preapproved list and the at least one receiver using the communication system configured based on the retrieved preferences;

presenting, in a user interface associated with a communication application, the at least one receiver with a plurality of options for associated services when the prioritized communication is received, the plurality of options comprising activating sensor data analysis applications, database access applications for retrieving data associated with the initiator, and a directory service of nearby facilities;

automatically activating, in the user interface, the plurality of other applications, the plurality of other applications including the sensor data analysis applications, the database access applications, and the directory service;

tracking a location of the at least one receiver;

adjusting a delivery mode for the prioritized communication when the receiver is determined to be at the same location as the initiator in the preapproved list, wherein the prioritized communication is not needed when the initiator is at the same location as the receiver.

10. The system of claim 9, wherein the initiator is enabled to send the request for prioritized communication by using one of: a hard key, a soft key, a menu item, a display icon in a communication device.

11. The system of claim 10, wherein the communication device is enabled to send the request for prioritized communication automatically based on an input from a sensor associated with the communication device.

12. The system of claim 11, wherein the sensor includes at least one of: a medical condition monitoring sensor and a gyroscopic sensor configured to detect a fall.

13. The system of claim 10, wherein the communication device is enabled to send the request for prioritized communication automatically based on an input from an application configured to monitor one of: a location of the communication device and expiration of a time period predefined by the at least one receiver.

14. The system of claim 9, wherein the system is part of one of: a hosted service, an organizational communication system, a telecommunication network, and Internet provider service.

15. The system of claim 9, wherein the initiator is associated with a group of receivers, and wherein at least one receiver of the group of receivers is enabled to provide the preferences for the group of receivers.

16. The system of claim 15, wherein the at least one receiver of the group of receivers is further enabled to designate target receivers for the initiator.

17. A non-transitory computer-readable storage medium with instructions stored thereon for providing prioritized communications, the instructions comprising:

receiving prioritized communication preferences from a receiver;

storing the received preferences in a data store;

enabling an initiator to send a prioritized communication request from a mobile device using one of: a hard key, a soft key, a menu item, a display icon in the mobile device in response to receiving the request for prioritized communication, determining whether the initiator is in a preapproved list of the receiver;

if the initiator is in the preapproved list, retrieving the stored preferences from the data store;

providing an alert to a communication device employed by the receiver based on the retrieved preferences;

in response to an indication from the receiver of acceptance of the prioritized communication, facilitating the communication between the initiator in the preapproved list and the receiver;

presenting, in a user interface associated with a communication application, the receiver with a plurality of options for associated services when the prioritized communication is received, the plurality of options comprising activating sensor data analysis applications, database access applications for retrieving data associated with the initiator, and a directory service of nearby facilities;

automatically activating, in the user interface, the plurality of other applications, the plurality of other applications including the sensor data analysis applications, the database access applications, and the directory service;

tracking a location of the receiver;

adjusting a delivery mode for the prioritized communication when the receiver is determined to be at the same location as the initiator in the preapproved list, wherein the prioritized communication is not needed when the initiator is at the same location as the receiver.

18. The non-transitory computer-readable storage medium of claim 17, wherein the instructions further comprise:

providing the alert based on the received preferences to an application in the receiver's communication device such that the receiver is notified by at least one from a set of: a graphic display alert, a text-based alert, a sound alert, and a vibration alert; and facilitating the prioritized communication through one of: an electronic mail exchange, a text message exchange, a voice communication, and a video communication.

19. The non-transitory computer-readable storage medium of claim 17, wherein the alert includes an electronic message encoded with an indication of the priority.

20. The non-transitory computer-readable storage medium of claim 17, wherein the additional services include one of: subscription services and pay-as-you-go services.

* * * * *